United States Patent
Yeon

(10) Patent No.: US 11,237,992 B2
(45) Date of Patent: Feb. 1, 2022

(54) PARALLEL PROCESSING SYSTEM AND OPERATION METHOD THEREOF

(71) Applicant: Samsung Electronics Co., Ltd., Suwon-si (KR)

(72) Inventor: Jeseung Yeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/956,244

(22) PCT Filed: Dec. 19, 2018

(86) PCT No.: PCT/KR2018/016238
§ 371 (c)(1),
(2) Date: Jun. 19, 2020

(87) PCT Pub. No.: WO2019/124972
PCT Pub. Date: Jun. 27, 2019

(65) Prior Publication Data
US 2020/0327075 A1    Oct. 15, 2020

(30) Foreign Application Priority Data
Dec. 20, 2017    (KR) .......................... 10-2017-0176476

(51) Int. Cl.
G06F 13/16    (2006.01)
(52) U.S. Cl.
CPC ...... G06F 13/1684 (2013.01); G06F 13/1689 (2013.01)
(58) Field of Classification Search
CPC ............ G06F 13/1684; G06F 13/1689; G06F 13/1657; G06F 13/1663
USPC ............................................. 710/308; 711/148
See application file for complete search history.

(56) References Cited

U.S. PATENT DOCUMENTS

| 6,564,294 | B1* | 5/2003 | Fujibayashi | .......... | G06F 3/0613 |
| | | | | | 709/213 |
| 6,823,472 | B1* | 11/2004 | DeKoning | ............ | G06F 15/167 |
| | | | | | 710/56 |
| 7,383,412 | B1 | 6/2008 | Diard | | |

(Continued)

FOREIGN PATENT DOCUMENTS

| JP | 2008-077151 A | 4/2008 |
| KR | 10-2012-0067865 A | 6/2012 |
| KR | 10-2014-0038075 A | 3/2014 |

OTHER PUBLICATIONS

International Search Report dated Mar. 25, 2019, issued in International Patent Application No. PCT/KR2018/016238.

*Primary Examiner* — Brian T Misiura
(74) *Attorney, Agent, or Firm* — Jefferson IP Law, LLP

(57) ABSTRACT

Provided are a parallel processing system and an operation method thereof. The parallel processing system includes: a bus; a plurality of parallel processing processors; a plurality of shared memories connected to the bus via separate individual channels and connected to each other via a memory connection line; and a main processor configured to set a broadcasting state for the plurality of shared memories and control data stored in one shared memory among the plurality of shared memories to be broadcast to another shared memory via the memory connection line according to the broadcasting state.

15 Claims, 6 Drawing Sheets

(56) References Cited

U.S. PATENT DOCUMENTS

| | | | |
|---|---|---|---|
| 7,463,535 B2 * | 12/2008 | Choi | G11C 5/02 |
| | | | 365/189.04 |
| 7,653,788 B2 | 1/2010 | Cousin et al. | |
| 9,286,650 B2 * | 3/2016 | Kegasawa | G06T 1/20 |
| 9,372,795 B2 | 6/2016 | Han | |
| 9,552,662 B2 * | 1/2017 | Lee | G06T 15/06 |
| 10,223,311 B2 * | 3/2019 | Doo | G06F 13/1689 |
| 10,393,803 B2 * | 8/2019 | Wilmoth | G11C 5/00 |
| 2004/0221112 A1 | 11/2004 | Greenfield | |
| 2009/0063786 A1 * | 3/2009 | Oh | G06F 13/1684 |
| | | | 711/148 |

* cited by examiner

PARALLEL PROCESSING SYSTEM AND OPERATION METHOD THEREOF

TECHNICAL FIELD

The present disclosure relates to a parallel processing system and an operation method thereof.

BACKGROUND ART

With the development of technology, the size of data to be processed by an electronic apparatus is continuously increasing. Thus, a processor with a better performance is required. However, there is a limit to increasing a performance of a single processor. For example, a clock speed needs to be increased to increase a performance of a processor, but when the clock speed is increased, power consumption is increased, thereby increasing heat generation. Also, the number of instructions capable of being simultaneously processed needs to be increased to improve an execution speed of a processor, but the overhead occurs consequently and thus the number of circuits of the processor is increased.

In this regard, parallel processing using a plurality of processors has been introduced. In the parallel processing, the plurality of processors may divide and process data in parallel to increase a processing speed. However, a system and operation method thereof for effectively performing a parallel processing operation are required.

DESCRIPTION OF EMBODIMENTS

Technical Problem

An embodiment may provide a parallel processing system for effectively performing a parallel processing operation and an operation method of the parallel processing system.

Solution to Problem

A parallel processing system according to an embodiment includes: a bus; a plurality of parallel processing processor; a plurality of shared memories connected to the bus via separate individual channels and connected to each other via a memory connection line; and a main processor configured to set a broadcasting state for the plurality of shared memories and control data stored in one shared memory among the plurality of shared memories to be broadcast to another shared memory via the memory connection line according to the broadcasting state.

Advantageous Effects of Disclosure

According to an embodiment, a parallel processing operation can be effectively performed.

BEST MODE

Figure 1:
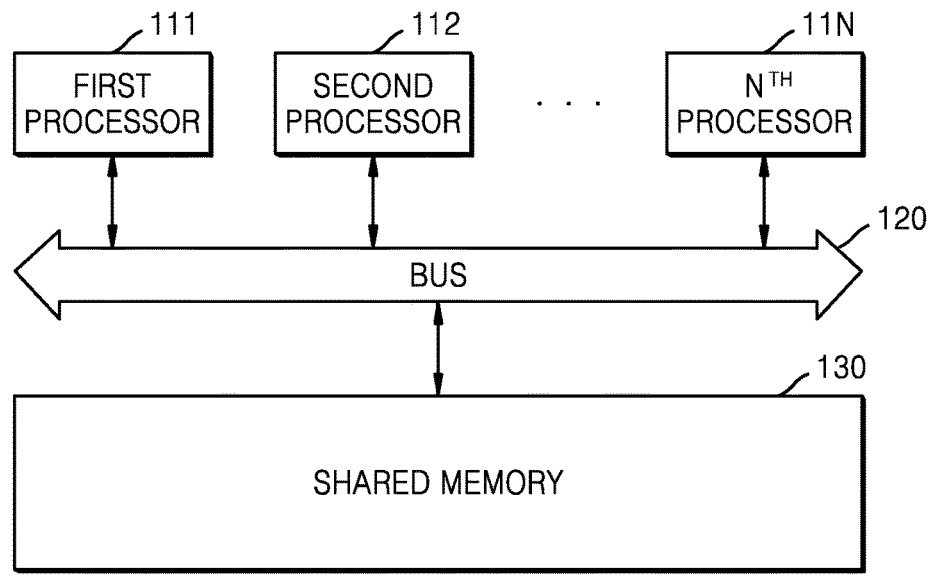
FIG. 1 is a diagram for describing a parallel processing system.

A parallel processing system according to an embodiment includes: a bus; a plurality of parallel processing processors; a plurality of shared memories connected to the bus via separate individual channels and connected to each other via a memory connection line; and a main processor configured to set a broadcasting state for the plurality of shared memories and control data stored in one shared memory among the plurality of shared memories to be broadcast to another shared memory via the memory connection line according to the broadcasting state.

An operation method of a parallel processing system, according to an embodiment, includes: setting a broadcasting state for a plurality of shared memories connected to a bus via separate channels and connected to each other via a memory connection line; and broadcasting data stored on one shared memory among the plurality of shared memories to another shared memory via the memory connection line, according to the broadcasting state.

A computer program product according to an embodiment includes a recording medium having stored therein a program for performing an operation method of a parallel processing system.

MODE OF DISCLOSURE

Hereinafter, embodiments of the present disclosure will be described in detail with reference to the accompanying drawings such that one of ordinary skill in the art may easily implement the present disclosure. However, the present disclosure may be implemented in various different forms and is not limited to the embodiments described herein. Also, in the drawings, parts irrelevant to the description are omitted in order to clearly describe the present disclosure, and like reference numerals designate like elements throughout the specification.

Some embodiments of the present disclosure may be represented by functional block configurations and various processing operations. Some or all of these functional blocks may be implemented by various numbers of hardware and/or software configurations that perform particular functions. For example, the functional blocks of the present disclosure may be implemented by one or more microprocessors or by circuit configurations for a certain function. Also, for example, the functional blocks of the present disclosure may be implemented in various programming or scripting languages. The functional blocks may be implemented by algorithms executed in one or more processors. In addition, the present disclosure may employ conventional techniques for electronic environment setting, signal processing, and/or data processing.

In addition, a connection line or a connection member between components shown in drawings is merely a functional connection and/or a physical or circuit connection. In an actual device, connections between components may be represented by various functional connections, physical connections, or circuit connections that are replaceable or added.

In addition, terms such as "unit" and "module" described in the present specification denote a unit that processes at least one function or operation, which may be implemented in hardware or software, or implemented in a combination of hardware and software. The "unit" or "module" is stored in an addressable storage medium and may be implemented by a program executable by a processor.

For example, the "unit" or "module" may be implemented by software components, object-oriented software components, class components, and task components, and may include processes, functions, attributes, procedures, subroutines, segments of program code, drivers, firmware, micro codes, circuits, data, a database, data structures, tables, arrays, or variables.

FIG. 1 is a diagram for describing a parallel processing system.

Referring to FIG. 1, the parallel processing system includes a plurality of processors 111 through 11N, a bus 120, and a shared memory 130. In FIG. 1, N is a natural number equal to or greater than 2.

The plurality of processors 111 through 11N perform parallel processing. Each of the processors 111 through 11N may process data stored in the shared memory 130 in parallel. In this regard, the plurality of processors 111 through 11N may each access the shared memory 130 via the bus 120 to invoke the data stored in the shared memory 130. In other words, the plurality of processors 111 through 11N may store (write) the data stored in the shared memory 130 in an internal memory (not shown) and then process the data stored in the internal memory (not shown).

The bus 120 is a connection line connecting components of a system. The bus 120 connects the processors 111 through 11N to the shared memory 130. In addition, although not shown in FIG. 1, the bus 120 may connect the components in the parallel processing system.

The shared memory 130 stores data to be processed by the plurality of processors 111 through 11N. The shared memory 130 may be connected to the bus 120 via one line or a limited number of lines. Also, the shared memory 130 is connected to the plurality of processors 111 through 11N via the bus 120.

For the plurality of processors 111 through 11N to perform parallel processing, each of the processors 111 through 11N needs to access the shared memory 130 and invoke the data. However, the bus 120 is not an exclusive connection line of a particular component of the system but is a common connection line used by the entire system. Also, the shared memory 130 is connected to the bus 120 that is the common connection line via one line or a limited number of lines. Accordingly, the number of components of the system accessible to the shared memory 130 at the same time is limited. In this regard, a system and method for effectively invoking data without traffic contention being occurred between the plurality of processors 111 through 11N when the plurality of processors 111 through 11N access the shared memory 130 for parallel processing are required.

Figure 2:
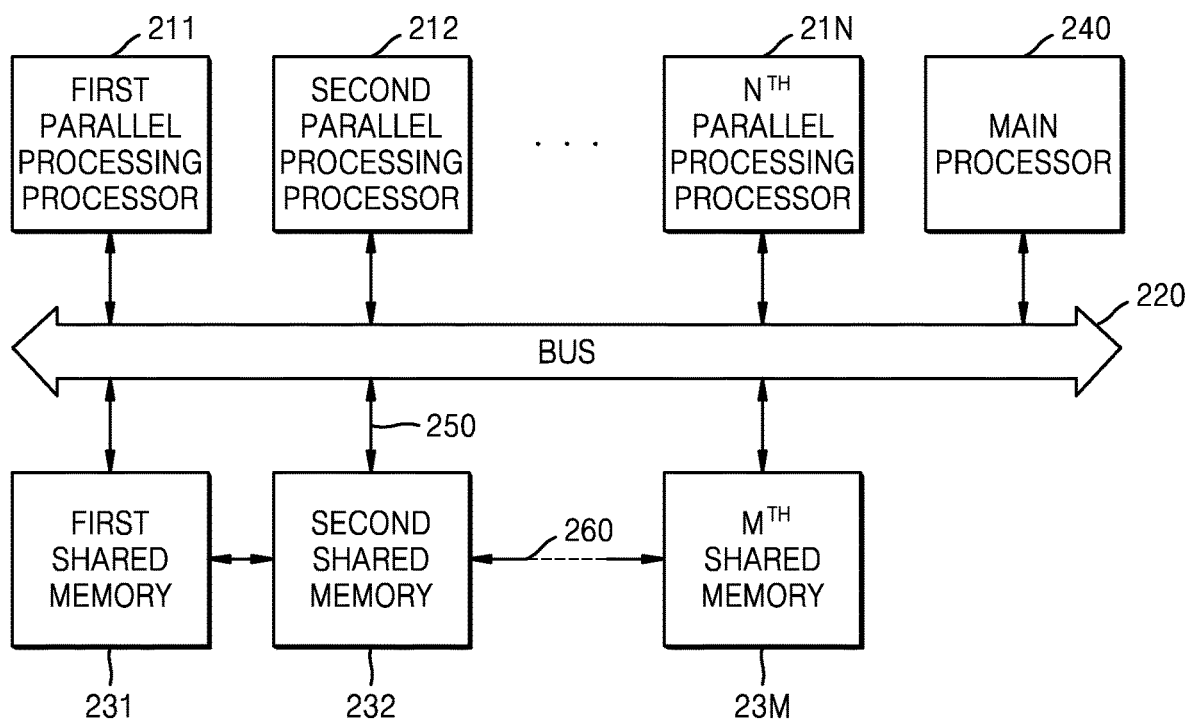
FIG. 2 is a diagram showing a parallel processing system according to an embodiment.

FIG. 2 is a diagram showing a parallel processing system according to an embodiment.

Referring to FIG. 2, the parallel processing system may include a plurality of parallel processing processors 211 through 21N, a bus 220, a plurality of shared memories 231 through 23M, and a main processor 240. In FIG. 2, N and M are each a natural number equal to or greater than 2.

The plurality of parallel processing processors 211 through 21N process data or a program. According to an embodiment, the plurality of parallel processing processors 211 through 21N may perform parallel processing on data according to control of the main processor 240. In particular, the plurality of parallel processing processors 211 through 21N may process data stored in the plurality of shared memories 231 through 23M in parallel according to control of the main processor 240. Each of the plurality of parallel processing processors 211 through 21N may be a dedicated processor for parallel processing or a processor for performing parallel processing when required. Also, each of the parallel processing processors 211 through 21N may include an internal memory (not shown). For example, each of the parallel processing processors 211 through 21N may include a direct access memory (DAM) such as a cache memory or a tightly coupled memory (TCM).

According to an embodiment, when data broadcasting is ended in the plurality of shared memories 231 through 23M, the plurality of parallel processing processors 211 through 21N may read broadcast data by accessing each of the plurality of shared memories 231 through 23M. In particular, the plurality of parallel processing processors 211 through 21N may invoke the data stored in the plurality of shared memories 231 through 23M by each accessing the plurality of shared memories 231 through 23M via the bus 220 according to control of the main processor 240. In other words, the plurality of parallel processing processors 211 through 21N may store (write) the data stored in the plurality of shared memories 231 through 23M in the internal memory (not shown) and then process the data stored in the internal memory (not shown) to perform parallel processing with respect to the same data or same function.

According to an embodiment, each of the parallel processing processors 211 through 21N may include an internal memory to minimize latency between a core and a data storage.

The bus 220 is a connection line connecting components of a system. According to an embodiment, the bus 220 connects the plurality of parallel processing processors 211 through 21N, the plurality of shared memories 231 through 23M, and the main processor 240. In addition, although not shown in FIG. 2, the bus 220 may connect the components in the parallel processing system.

The plurality of shared memories 231 through 23M store data and program processed by each component of the parallel processing system. According to an embodiment, the plurality of shared memories 231 through 23M store data to be processed by the plurality of parallel processing processors 211 through 21N. According to an embodiment, the plurality of shared memories 231 through 23M may be connected to each of the plurality of parallel processing processors 211 through 21N via the bus 220.

The plurality of shared memories 231 through 23M may be connected to the bus 220 via one line or a limited number of lines. According to an embodiment, the plurality of shared memories 231 through 23M may be connected to the bus 220 via different individual connection lines, i.e., individual memory channels 250. Also, the plurality of shared memories 231 through 23M may be connected to each other via a memory connection line 260 different from the bus 220. Accordingly, the plurality of shared memories 231 through 23M may share data via the memory connection line 260 instead of the bus 220 that is a common connection line.

According to an embodiment, the memory connection line 260 may be a path through which broadcast data is transmitted. Data on which parallel processing is to be performed by the plurality of parallel processing processors 211 through 21N may be stored in at least one shared memory from among the plurality of shared memories 231 through 23M. The plurality of shared memories 231 through 23M may share data on which parallel processing is to be performed, via the memory connection line 260.

According to an embodiment, the plurality of shared memories 231 through 23M may share data via the memory connection line 260, and thus are able to share data without occupying the memory channel 250.

The main processor 240 controls overall operations of the parallel processing system. According to an embodiment, the main processor 240 may control operations for parallel processing of the parallel processing system. In particular, the main processor 240 may set a broadcasting state for the plurality of shared memories 231 through 23M and control data stored in one shared memory from among the plurality of shared memories 231 through 23M to be broadcast to another shared memory via the memory connection line 260 according to the broadcasting state. For example, when data on which parallel processing is to be performed is stored in the first shared memory 231, the main processor 240 may set the broadcasting state of the first shared memory 231 through $M^{th}$ shared memory 23M and control the data stored in the first shared memory 231 to be broadcast to the second shared memory 232 through $M^{th}$ shared memory 23M according to the broadcasting state of each shared memory.

According to an embodiment, from among the plurality of shared memories 231 through 23M, the main processor 240 may set a shared memory storing original data as an owner state, a shared memory that is a last broadcasting target as a destination state, a shared memory that stores (writes) broadcast data and transmits the broadcast data to another shared memory as a forward state, a shared memory that transmits the broadcast data to another shared memory without storing the broadcast data as a bypass state, and a shared memory that does not perform broadcasting as a no broadcasting state.

According to an embodiment, the main processor 240 may be an individual processor different from the plurality of parallel processing processors 211 through 21N or one of the plurality of parallel processing processors 211 through 21N may be the main processor 240. When one of the plurality of parallel processing processors 211 through 21N is the main processor 240, the processor may control overall operations of the parallel processing system while performing the parallel processing.

According to an embodiment, the parallel processing system may be implemented as one apparatus or as a system-on-chip (SoC).

According to an embodiment, the main processor 240 broadcasts the data stored in one shared memory from among the plurality of shared memories 231 through 23M to another shared memory via the memory connection line 260 such that the plurality of parallel processing processors 211 through 21N access, at the same time, the shared memory storing the data on which the parallel processing is to be performed, thereby reducing occurrence of contention. Accordingly, overall latency may be reduced, and throughput may be increased.

Figure 3:
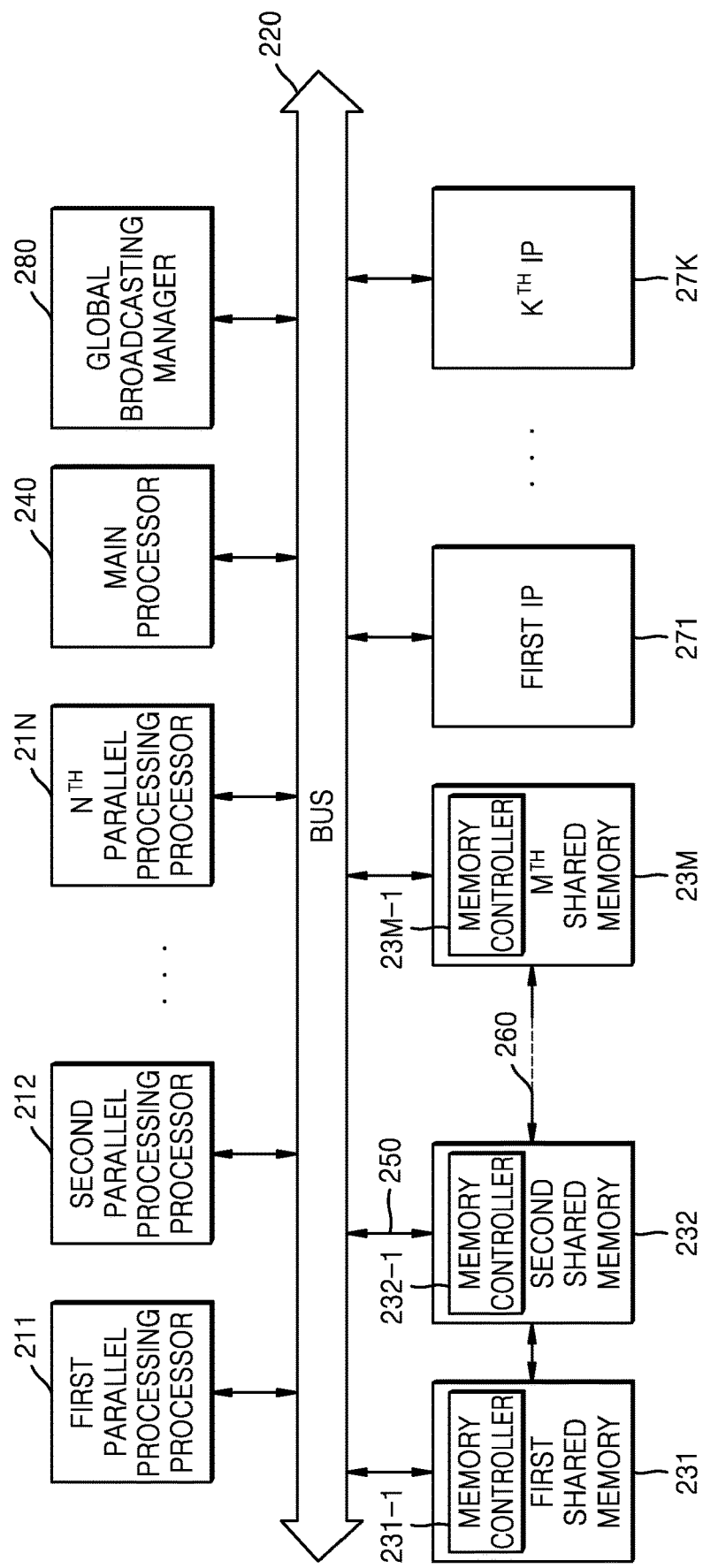
FIG. 3 is a diagram showing a parallel processing system according to another embodiment.

FIG. 3 is a diagram showing a parallel processing system according to another embodiment.

Referring to FIG. 3, the parallel processing system may include the plurality of parallel processing processors 211 through 21N, the bus 220, the plurality of shared memories 231 through 23M, the main processor 240, a plurality of intellectual properties (IPs) 271 through 27K, a global broadcasting manager 280, and a broadcasting area checker. In FIG. 2, N and M are each a natural number equal to or greater than 2, and K is a natural number equal to or greater than 1.

The plurality of parallel processing processors 211 through 21N, the bus 220, the plurality of shared memories 231 through 23M, and the main processor 240 of FIG. 3 are the same components as the plurality of parallel processing processors 211 through 21N, the bus 220, the plurality of shared memories 231 through 23M, and the main processor 240 described with reference to FIG. 2. Thus, redundant details will be omitted or briefly described.

As described with reference to FIG. 2, the plurality of parallel processing processors 211 through 21N process data or program, and the bus 220 is a connection line connecting each component of a system.

The plurality of shared memories 231 through 23M store data and program processed by each component of the parallel processing system. According to an embodiment, the plurality of shared memories 231 through 23M may respectively include memory controllers 231-1 through 23M-1 controlling operations of shared memories. According to an embodiment, the memory controllers 231-1 through 23M-1 may set a broadcasting area where broadcast data may be stored according to control of the main processor 240, set a broadcasting state for the broadcasting area, and control broadcasting. The memory controllers 231-1 through 23M-1 may include a local broadcasting manager (not shown) controlling broadcasting of a corresponding shared memory. Also, each of the memory controllers 231-1 through 23M-1 may include a register where information about the broadcasting area and broadcasting state is stored. According to an embodiment, the memory controllers 231-1 through 23M-1 may perform broadcasting according to the broadcasting state set for the broadcasting area. In other words, the broadcasting may be performed based on whether the broadcasting area is in an owner state, a destination state, a forward state, a bypass state, or a no broadcasting state.

According to an embodiment, when an access via the bus 220 is detected during the broadcasting, the memory controllers 231-1 through 23M-1 may control the broadcasting to be stopped. When the broadcasting is stopped, the memory controllers 231-1 through 23M-1 may generate an error signal and transmit the error signal to the main processor 240. In addition, after a master IP stores original data in a corresponding shared memory, the memory controllers 231-1 through 23M-1 may transmit, to the global broadcasting manager 280, an end signal indicating that storing of the original data is ended.

The main processor 240 controls overall operations of the parallel processing system. According to an embodiment, the main processor 240 may set at least one IP not to access the broadcasting area. Also, the main controller 240 may control only the master IP containing the original data among the at least one IP to store (write) the original data in one shared memory among the plurality of shared memories 231 through 23M.

According to an embodiment, the main processor 240 may control the broadcasting area checker (not shown) of the IPs 271 through 27K to set each of the IPs 271 through 27K not to use the broadcasting area during the broadcasting. Thereafter, the main processor 240 may perform the broadcasting by controlling the global broadcasting manager 280.

The IP, the master IP, the broadcasting area checker, and the global broadcasting manager 280 will be described below.

The plurality of IPs 271 through 27K is a design block applicable to the parallel processing system and may perform a particular function. Such a plurality of IPs 271 through 27K may generate data and store the data in a shared memory or invoke data stored in a shared memory while performing a function in charge. Among IPs, an IP that generates a request regarding a shared memory, i.e., contains or generates original data, is referred to as a master IP. According to an embodiment, the master IP may store the original data in the shared memory according to control of the main processor 240.

According to an embodiment, the plurality of IPs 271 through 27K may include the broadcasting area checker (not shown). The broadcasting area checker may set an IP not to use the broadcasting area according to control of the main processor 240. The broadcasting area checker may include a register where information about the broadcasting area and a broadcasting state is stored. According to an embodiment, when the main processor 240 sets the broadcasting area set for each of the plurality of shared memories 231 through 23M to the broadcasting area checker, the global broadcasting manager 280 may limit an IP not to use the broadcasting area. Here, the use of remaining areas of a shared memory excluding the broadcasting area is not limited.

The global broadcasting manager 280 may control overall broadcasting processes according to control of the main processor 240. According to an embodiment, the global broadcasting manager 280 may set the broadcasting state in each of the memory controllers 231-1 through 23M-1 and the register of the broadcasting area checker according to control of the main processor 240. Each of the memory controllers 231-1 through 23M-1 and the register of the broadcasting area checker may store information about the broadcasting area and the broadcasting state.

According to an embodiment, the global broadcasting manager 280 may perform the broadcasting by controlling the memory controller of each shared memory. In particular, the global broadcasting manager 280 may perform the broadcasting by controlling the local broadcasting manager included in each shared memory. Also, according to an embodiment, the global broadcasting manager 280 may determine an end time point of the broadcasting and transmit an end signal to the main processor 240 at the end time point. In particular, because a hardware cycle consumed in the broadcasting is fixed, the global broadcasting manager 280 may determine the end time point of the broadcasting by receiving a signal indicating that storing of original data is ended from a memory controller of a shared memory including a broadcasting area in an owner state. According to an embodiment, when the broadcasting is ended, the global broadcasting manager 280 may set the broadcasting states of all shared memories 231 through 23M to no broadcasting states.

According to an embodiment, not all components shown in FIG. 3 are essential. In other words, the parallel processing system may be operated with only some components of FIG. 3. In this case, some components may be included in another component or functions of some components may be performed by another component. For example, the global broadcasting manager 280 may be included in the main processor 240 or functions of the global broadcasting manager 280 may be performed by the main processor 240.

Figure 4:
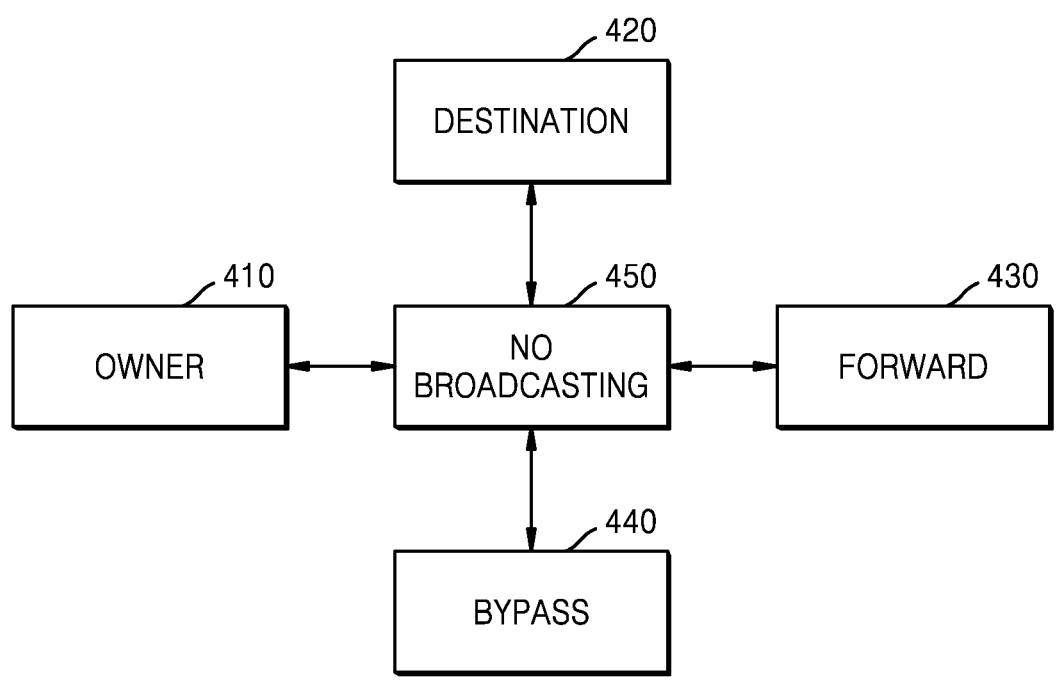
FIG. 4 is a diagram for describing a broadcasting state according to an embodiment.

FIG. 4 is a diagram for describing a broadcasting state according to an embodiment.

Referring to FIG. 4, a broadcasting state may include an owner state 410, a destination state 420, a forward state 430, a bypass state 440, and a no broadcasting state 450.

In more detail about the broadcasting state, the owner state 410 may be set for a shared memory where a master IP that generates a request for the shared memory, i.e., contains or generates original data, stores (writes) the original data.

Accordingly, when the owner state 410 is set for one shared memory among the plurality of shared memories 231 through 23M, the original data may be stored in the shared memory. The destination state 420 may be set for a shared memory to which broadcast data is broadcast last. Accordingly, when the destination state 420 is set for one shared memory among the plurality of shared memories 231 through 23M, broadcasting may be ended at the shared memory. The destination state 420 may be set for one shared memory or a plurality of shared memories based on a connection relationship between shared memories.

The forward state 430 may be set for a shared memory that stores broadcast data and transmits the broadcast data to another shared memory. In other words, the forward state 430 may be set for a shared memory that is not in the owner state 410 or the destination state 420, is located on a path between a shared memory in the owner state 410 and a shared memory in the destination state 420, and stores the broadcast data. The bypass state 440 may be set for a shared memory that transmits broadcast data to another shared memory without storing the broadcast data. In other words, the bypass state 440 may be set for a shared memory that is not in the owner state 410 or the destination state 420, is located on the path between the shared memory in the owner state 410 and the shared memory in the destination state 420, and transmits the broadcast data to another shared memory without storing the broadcast data.

Also, the no broadcasting state 450 may be set for a shared memory that does not perform broadcasting. In other words, when a shared memory is set as the no broadcasting state 450, the shared memory does not participate in the broadcasting.

FIG. 4 illustrates as if a state setting is formed between the owner state 410, the destination state 420, the forward state 430, the bypass state 440, and the no broadcasting state 450, but this is only for convenience of description and the state of a shared memory may be set without limitation. For example, the forward state 430 may be set for a shared memory that is in the owner state 410.

Also, in the above description, a broadcasting state is set for a shared memory, but an embodiment is not limited thereto, and a broadcasting state may be set in a unit smaller than a shared memory. For example, a shared memory may be divided in broadcasting area units and a broadcasting state may be set in such broadcasting area units. This will be described again below.

Figure 5:
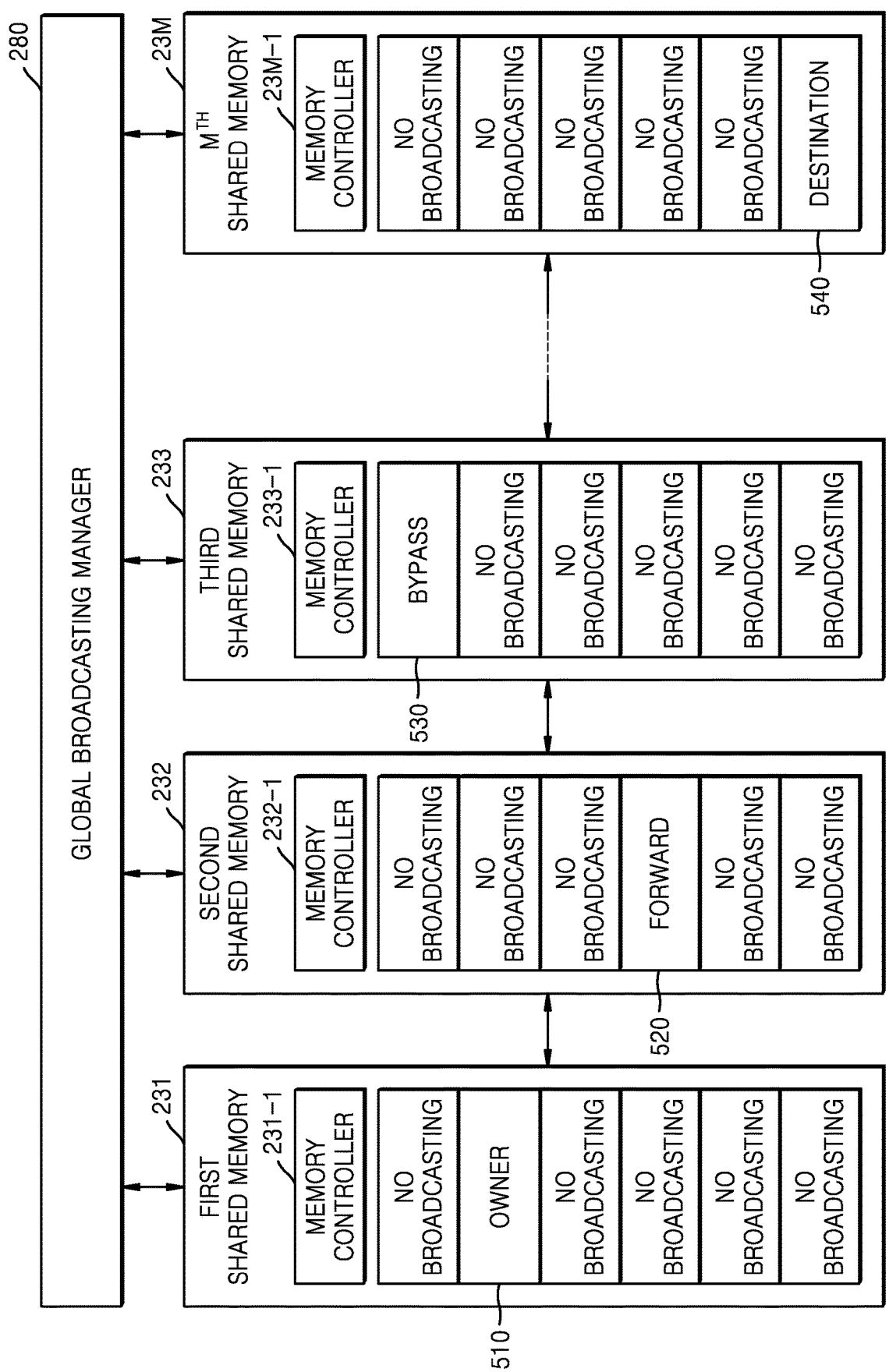
FIG. 5 is a diagram for describing a broadcasting process between shared memories, according to an embodiment.

FIG. 5 is a diagram for describing a broadcasting process between shared memories, according to an embodiment.

Referring to FIG. 5, the plurality of shared memories 231 through 23M may respectively include the memory controllers 231-1 through 23M-1 controlling operations of shared memories. Here, each of the memory controllers 231-1 through 23M-1 may divide a physical memory area of a corresponding shared memory in broadcasting area units and set a broadcasting state for each broadcasting area.

For example, in the first shared memory 231, the memory controller 231-1 may divide the physical memory area in broadcasting area units, set an owner state for a broadcasting area 510, and set a no broadcasting state for remaining areas.

In FIG. 5, the sizes of the broadcasting areas are illustrated to be the same size, but this is only an example and the sizes of the broadcasting areas may be freely set as required in a shared memory or different shared memories.

According to an embodiment, when the global broadcasting manager 280 performs broadcasting according to control of the main processor 240, the global broadcasting manager 280 may perform broadcasting by controlling the memory controllers 231-1 through 23M-1 respectively included in the plurality of shared memories 231 through 23M. Here, the memory controllers 231-1 through 23M-1 may include a local broadcasting manager (not shown) controlling the broadcasting.

As described above, each of the memory controllers 231-1 through 23M-1 may divide the physical memory area of the corresponding shared memory in broadcasting area units according to control of the global broadcasting manager 280 and set the broadcasting state for each broadcasting area. Then, when the broadcasting is performed, the broadcasting may be performed according to a state of the broadcasting area.

For example, when the broadcasting area 510 of the first shared memory 231 is set as the owner state, the memory controller 231-1 stores original data of a master IP in the broadcasting area 510 set as the owner state after the broadcasting starts. Then, the memory controller 231-1 transmits data stored in the broadcasting area 510 to the second shared memory 232 that is an adjacent shared memory.

Next, because a broadcasting area 520 of the second shared memory 232 is set as a forward state, the memory controller 232-1 of the second shared memory 232 stores the received data in the broadcasting area 520 and transmits the data to the third shared memory 233 that is an adjacent shared memory. Because a broadcasting area 530 of the third shared memory 233 is set as a bypass state, the memory controller 233-1 of the third shared memory 233 may transmit the data to an adjacent shared memory without storing the received data.

Furthermore, because a broadcasting area 540 of the $M^{th}$ shared memory 23M is set as a destination state, the memory controller 23M-1 of the $M^{th}$ shared memory 23M that is a last shared memory receiving the data stores the received data in the broadcasting area 540 and ends the broadcasting.

According to an embodiment, when an access via the bus 220 is detected during the broadcasting, each of the memory controllers 231-1 through 23M-1 may control the broadcasting to be stopped. When the broadcasting is stopped, the memory controllers 231-1 through 23M-1 may generate an error signal and transmit the error signal to the main processor 240.

Also, according to an embodiment, when the access via the bus 220 is detected during the broadcasting, each of the memory controllers 231-1 through 23M-1 may change the broadcasting state of the broadcasting area. In particular, when the access via the bus 220 is detected during the broadcasting while a broadcasting state of a broadcasting area is a forward state, the broadcasting state of the broadcasting area may be changed to a bypass state. According to an embodiment, by changing the broadcasting state of the broadcasting area, the broadcasting may be continuously performed without being stopped even when the access via the bus 220 is detected, i.e., even when an error is generated.

In addition, when the broadcasting state is set or the data is received to be stored or transmitted during the broadcasting, each of the memory controllers 231-1 through 23M-1 may select a particular broadcasting area to set a broadcasting state for the selected broadcasting area or store the data.

Figure 6:
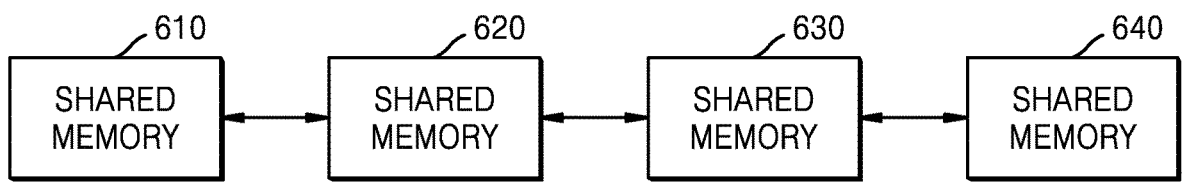
FIGS. 6 through 8 are diagrams for describing a connection form of shared memories.
Figure 7:
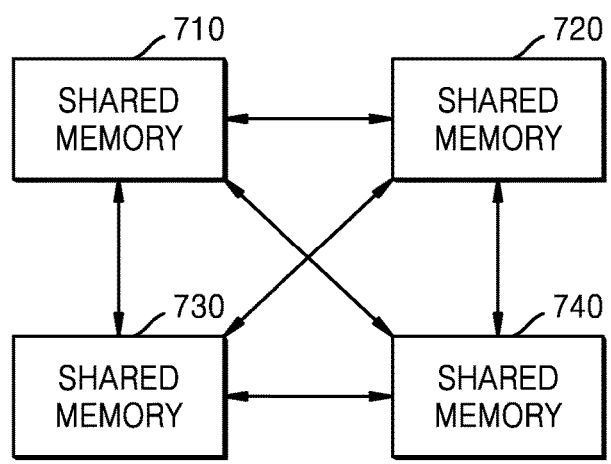
Figure 8:
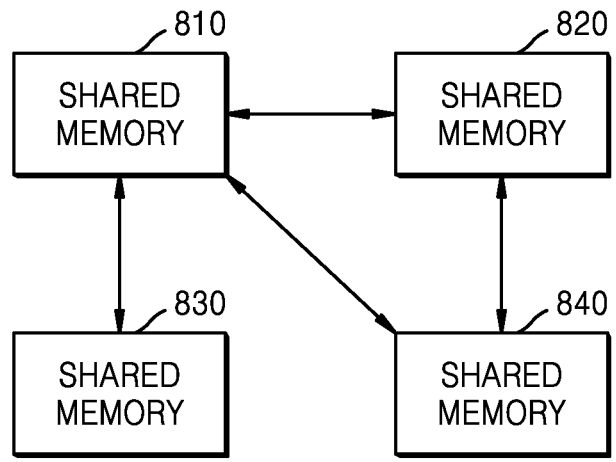

FIGS. 6 through 8 are diagrams for describing a connection form of shared memories.

Referring to FIGS. 6 through 8, shared memories may be connected in various forms. According to an embodiment, a broadcasting state set for a broadcasting area may vary according to a connection form of shared memories. For example, regarding a destination state, the destination state may be set for one shared memory or for a plurality of shared memories according to a connection relationship between the shared memories.

In FIG. 6, shared memories 610 through 640 are connected in series. In this case, when the shared memories 610 and 640 located at both ends are set as owner states, the shared memories 640 and 610 located at opposite ends may be set as destination states and the shared memories 620 and 630 located in the middle may be set as a forward state or bypass state. On the other hand, when the shared memories 620 and 630 located in the middle are set as owner states, the shared memory 610 or 640 located at an end of one direction may be set as a destination state when data is transmitted in the one direction or the shared memories 610 and 640 located at both ends may be set as destination states when data is transmitted in both directions.

In FIG. 7, shared memories 710 through 740 are all connected to each other. In this case, even when one shared memory is set as an owner state, remaining shared memories may all be set as destination states. For example, when the shared memory 720 is set as an owner state, the shared memories 710, 730, and 740 may all be set as destination states according to a data transmission path.

In FIG. 8, shared memories 810, 820, and 840 are connected in a circulation form, but a shared memory 830 is connected only to the shared memory 810. Accordingly, the shared memory 830 may be set only as an owner state or a destination state.

Connection forms of shared memories shown in FIGS. 6 through 8 are only examples and the connection forms may vary according to demands.

Figure 9:
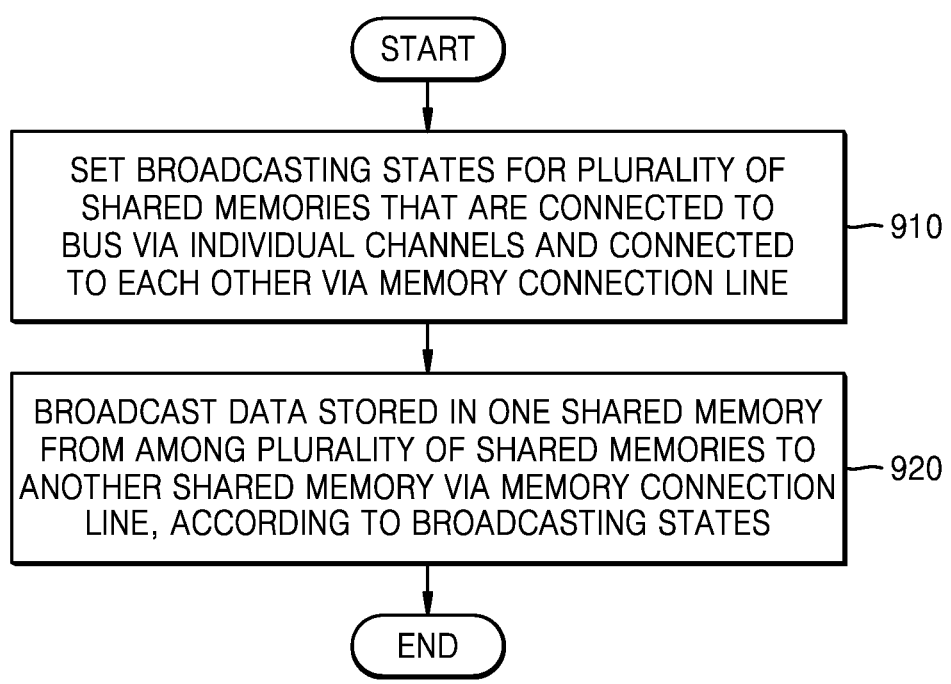
FIG. 9 is a flowchart of an operation method of a parallel processing system, according to an embodiment.

FIG. 9 is a flowchart of an operation method of a parallel processing system, according to an embodiment.

First, in operation 910, the parallel processing system sets broadcasting states for a plurality of shared memories that are connected to a bus via separate channels and connected to each other via a memory connection line.

According to an embodiment, when setting the broadcasting states, the parallel processing system may set a broadcasting area where broadcast data is storable and set a broadcasting state for the broadcasting area. Also, while setting the broadcasting state, the parallel processing system may set a shared memory storing original data as an owner state, set a shared memory that is a last broadcasting target as a destination state, set a shared memory that stores (writes) broadcast data and transmits the broadcast data to another shared memory as a forward state, set a shared memory that transmits broadcast data to another shared memory without storing the broadcast data as a bypass state, and set a shared memory that does not perform broadcasting as a no broadcasting state.

According to an embodiment, the parallel processing system may set a broadcasting state of a broadcasting area and set each IP of the parallel processing system not to use the broadcasting area during the broadcasting.

Then, in operation 920, the parallel processing system broadcasts data stored in one shared memory from among the plurality of shared memories to another shared memory via the memory connection line, according to the broadcasting states.

According to an embodiment, during the broadcasting, the parallel processing system may set at least one IP accessible to the plurality of shared memories not to access the broadcasting area and a master IP containing original data from among the at least one IP may store the original data in one of the plurality of shared memories. Next, the parallel processing system may perform the broadcasting according to the broadcasting state set for the broadcasting area. In other words, the broadcasting may be performed based on whether the broadcasting area is in an owner state, a destination state, a forward state, a bypass state, or a no broadcasting state.

According to an embodiment, the parallel processing system may stop the broadcasting when an access via the bus is detected during the broadcasting. In this case, the parallel processing system may generate an error signal.

According to an embodiment, the parallel processing system may determine an end time point of the broadcasting and end the broadcasting at the end time point. Also, the parallel processing system may perform parallel processing on data broadcast to the plurality of shared memories after the broadcasting ends.

Meanwhile, the above-described embodiments may be written as a program executable on a computer and may be implemented in a general-purpose digital computer operating the program using a computer-readable recording medium. In addition, a structure of the data used in the above-described embodiments may be recorded on a computer-readable medium through various methods. The above-described embodiments may also be realized in a form of a recording medium including instructions executable by a computer, such as a program module executed by a computer. For example, methods implemented by a software module or algorithm may be stored in a computer-readable recording medium as computer-readable and executable codes or program instructions.

A computer-readable recording medium may be an arbitrary recording medium accessible by a computer, and examples thereof may include volatile and non-volatile media and separable and non-separable media. A computer-readable medium may include, but is not limited to, a magnetic storage medium, for example, read-only memory (ROM), floppy disk, hard disk, or the like, an optical storage medium, for example, CD-ROM, DVD, or the like. Further, examples of the computer-readable recording medium may include a computer storage medium and a communication medium.

Also, a plurality of computer-readable recording media may be distributed over network-coupled computer systems, and data stored in the distributed recording media, for example, program instructions and codes, may be executed by at least one computer.

Hereinabove, the embodiments of the present disclosure have been described with reference to the accompanying drawings, but it will be understood by one of ordinary skill in the art that the present disclosure may be executed in other specific forms without changing technical ideas or essential features. Accordingly, the above embodiments are examples only in all aspects and are not limited.

The invention claimed is:

1. A parallel processing system comprising:
a bus;
a plurality of parallel processing processors;
a plurality of shared memories connected to the bus via separate individual channels and connected to each other via a memory connection line; and
a main processor configured to:
set a broadcasting state for each of the plurality of shared memories, the broadcasting state being one of an owner state, a destination state, a forward state, a bypass state, or a no broadcasting state, and
control data stored in a first shared memory of the plurality of shared memories, the first shared memory being in the owner state, to be broadcast to a second shared memory, the second shared memory being in the destination state, via the memory connection line according to the broadcasting state.

2. The parallel processing system of claim 1, wherein each of the plurality of shared memories comprises a memory controller configured to control operations of the plurality of shared memories, and wherein the memory controller is further configured to set a broadcasting area where data broadcast according to control of the main processor is storable, set the broadcasting state for the broadcasting area, and control the broadcasting.

3. The parallel processing system of claim 2, further comprising at least one intellectual property (IP) accessible to the plurality of shared memories, wherein the main processor is further configured to set the at least one IP not to access the broadcasting area, and control only a master IP containing original data among the at least one IP to write the original data on one shared memory among the plurality of shared memories.

4. The parallel processing system of claim 2, wherein the memory controller is further configured to, when an access via the bus is detected during the broadcasting, control the broadcasting to be stopped.

5. The parallel processing system of claim 4, wherein the memory controller is further configured to, when the broadcasting is stopped, generate an error signal and transmit the error signal to the main processor.

6. The parallel processing system of claim 2, further comprising a global broadcasting manager configured to perform broadcasting by controlling the memory controller according to control of the main processor, wherein the global broadcasting manager is further configured to determine an end time point of the broadcasting and transmit an end signal to the main processor at the end time point.

7. The parallel processing system of claim 2, wherein the plurality of parallel processing processors are configured to, when the broadcasting is ended, read the broadcast data by accessing the plurality of shared memories.

8. The parallel processing system of claim 1, wherein the main processor is further configured to:
set a shared memory storing original data as the owner state, set a shared memory that is a last broadcasting target as the destination state,
set a shared memory that writes broadcast data and transmits the broadcast data to another shared memory as the forward state,
set a shared memory that does not store the broadcast data but transmits the broadcast data to another shared memory as the bypass state, and
set a shared memory that does not perform broadcasting as the no broadcasting state.

9. The parallel processing system of claim 1, wherein the main processor is one processor among the plurality of parallel processing processors.

10. The parallel processing system of claim 1, wherein the memory connection line is a path through which broadcast data is transmitted.

11. An operation method of a parallel processing system, the operation method comprising:
setting a broadcasting state for each of a plurality of shared memories connected to a bus via separate channels and connected to each other via a memory connection line, the broadcasting state being one of an owner state, a destination state, a forward state, a bypass state, or a no broadcasting state; and broadcasting data stored on a first shared memory of the plurality of shared memories, the first shared memory being set to the owner state, to a second shared memory, the second shared memory being set to the destination state, via the memory connection line, according to the broadcasting state.

12. The operation method of claim 11, wherein the setting of the broadcasting state comprises:

setting a broadcasting area where the broadcast data is storable; and setting the broadcasting state for the broadcasting area.

13. The operation method of claim 12, wherein the broadcasting comprises:

setting at least one intellectual property (IP) accessible to the plurality of shared memories not to access the broadcasting area; and writing, by a master IP containing original data among the at least one IP, the original data on one shared memory among the plurality of shared memories.

14. The operation method of claim 12, wherein the broadcasting comprises, when an access via the bus is detected during the broadcasting, stopping the broadcasting.

15. The operation method of claim 14, wherein the broadcasting comprises, when the broadcasting is stopped, generating an error signal.

* * * * *